3,442,665
PROCESS FOR PREPARING SAND CORES USING $CO_2$ CURED SILICATE BINDERS

Arno Müller, Reisholzstrasse 18, Hilden, Rhineland, Germany, and Günter Wagner, Kruppstrasse 8, Dusseldorf, Germany
No Drawing. Filed June 13, 1966, Ser. No. 556,895
Int. Cl. B28b 7/34
U.S. Cl. 106—38.35         11 Claims

---

ABSTRACT OF THE DISCLOSURE

The moisture resistance of sand cores prepared by mixing sand with water-soluble silicates (e.g., sodium silicate) and curing the silicate is improved by adding to the sand mix prior to curing minor amount sufficient to impart moisture resistance to the core (e.g., from 0.0003 to 0.5 weight percent based on sand) of an alkali metal alkyl or aryl siliconate.

---

The present invention relates to the preparation of sand cores and sand molds for use in the production of metal castings. In one aspect, the present invention relates to improvements in sand cores prepared by mixing sand with water-soluble silicates (e.g. sodium silicate) which are thereafter cured with carbon dioxide. The improvements results in sand cores having a reduced tendency to lose their strength after storage under humid conditions.

In recent years, there has been considerable interest in the preparation of sand cores (and sand molds) from sand/alkali metal silicate mixtures which are cured or hardened in the desired casting-defining shapes by reaction with gaseous curing agents such as carbon dioxide. The metal silicates used as binders to form such sand cores are ordinarily employed as aqueous solutions.

When such water-soluble silicates (e.g. aqueous sodium silicate or waterglass) are reacted with carbon dioxide (i.e. $CO_2$) in the presence of sand, the silicate is converted into a silicate or silica gel which binds the individual sand grains together to form a sand core having the desired shape. This reaction product (silica gel) is water-resistant. However, by-products of this reaction of sodium silicate with carbon dioxide include the sodium carbonates which are readily dissolved in water and are partially hydroscopic.

This known core-forming process (typically referred to as the "$CO_2$ process") is widely used because of certain advantages which include the speed at which cores can be prepared, the elimination of the need for baking to obtain a cure, and the like. Although sand cores prepared by this process have a number of disadvantages, many of these disadvantages have been eliminated or substantially reduced by various modifications of the basic process. For example, sand cores prepared by the simple practice of the $CO_2$ process have poor collapsibility characteristics. However, the collapsibility characteristics of such sand cores can be substantially improved by adding products like molasses, dextrose, dextrin, sugar, urea, and phenolic resins to the sand/silicate mixtures. Certain phenolic resins have been developed especially for this purpose. Discussions of the $CO_2$ process and of these prior art improvements can be found in various publications. See, for example, U.S. Patent 2,952,553 which is incorporated herein by reference.

In spite of these prior art improvements, there are still disadvantages which accompany the practice of the $CO_2$ process. One such disadvantage is that the sand cores and sand molds are very sensitive to moisture, and their useful life, especially when stored in wet foundry sand, is very limited.

It has now been discovered, and this discovery forms a basis for the present invention, that the moisture sensitivity and the useful life of such a $CO_2$/silicate bound sand core can be materially improved if certain silicon compounds are included in the foundry mixes used to prepare such sand cores. As used herein, the term "foundry mix" means sand which has been mixed with a binding amount of a curable binder. The foundry mixes of the present invention will contain sand as the predominant ingredient and a binding amout of a water-soluble silicate plus a core improving amount of the silicon additives described herein. Such foundry mixes can optionally contain various other ingredients such as molasses, iron oxide, ground flax fibers, and the like.

The inclusion of these silicon additives in such foundry mixes results in sand cores which are far more resistant to moisture (e.g. moisture present as humidity in the air or present in wet foundry sand) and which show a substantially lower loss of strength when compared to unimproved sand cores (which normally lose strength as a result of water absorption).

The silicon additives used in the practice of the present invention are the alkali-alkyl-siliconates or polysiloxanes and the alkali-aryl-siliconates or polysiloxanes. See Encyclopedia of Chemical Technology by Kirk & Othmer, vol. 12, pp. 365–392 (1954). The low alkali-alkyl-siliconates or -polysiloxanes and the alkali-phenyl-siliconates or -polysiloxanes are preferred.

Suitable silicon additives are the alkali metal salts of organosilanols. Frequently these salts will be halo-substituted. Suitable salts include lithium trimethyl silanolate, sodium trimethylsilanolate, sodium triphenylsilanolate, di-sodium diphenyl silanolate, sodium dimethyl chloro silanolate, and the like.

The polysiloxanes employed in the process of the present invention are low molecular weight condensation products of alkali-alkyl-siliconates or alkali-aryl-siliconates. Mixtures of the silicon additives can be used.

In selecting a particular silicon additive, it should be one which is compatible with the alkali metal silicate actually used in the foundry mix and should not cause any undesirable side effects. The amount of silicon additive employed in these foundry mixes can vary widely, depending upon the activity of the particular silicon additive and the result that is desired. Depending upon the particular silicon additive, amounts as small as 0.0003 and up to about 0.5% of the total weight of the sand in the foundry mix can be used. Alternatively, the amount of silicon additive to be added can be calculated on the basis of the weight of the aqueous solution of water-soluble silicate used as the binder. Although greater or lesser amounts can be used, it is convenient to employ from 2-10% of the silicon additive based on the weight of the aqueous solution of the water-soluble alkali metal silicate. Preferably, from 5-8% of the total weight of the aqueous water-soluble silicate will be used.

Foundry mixes prepared according to this invention should preferably contain an inorganic or organic collapsibility promoting agent (e.g. one of those collapsibility improving agents previously described).

One other preferred form of this invention involves the additional inclusion in the foundry mix of an alkaline earth metal hydroxide. Calcium hydroxide gives the best result and therefore is especially preferred.

The metal silicates used in practicing the present invention are typically represented by the general formula $M_2O \cdot nSiO_2$ wherein M represents a metal ion and $n$ is an integer (e.g. 2.5). The alkali metal silicates, especially the sodium silicates, are preferred. Metal silicates of this type are well known and are commercially available. Mixtures of metal silicates can be used. Such metal silicates are usually sold as powders (anhydrous or hydrated) or as aqueous solutions. Typically, the weight ratio of $M_2O:SiO_2$ in commercially available silicates is between 1:0.5 and 1:5, more usually from 1:1.5 to 1:3.3. The aqueous solutions usually (although not always) contain between 40 and 75 weight percent water, e.g. 50-70 weight percent water. The balance, e.g. 35% is metal silicate.

Thus, the ordinary practice of the present invention involves the preparation of a foundry mix containing sand as the predominant ingredient, a small amount of the silicon additives of this invention, and a binding amount, usually less than 10% by weight based on the weight of sand (e.g. 1-5% on the same basis) of an aqueous solution of a water-soluble alkali metal silicate. If desired, such a mix can optionally and desirably contain other known ingredients. Subsequently, this foundry mix is shaped and then contacted or treated with gaseous carbon dioxide to thereby cure or harden the shaped sand to thereby form a sand core.

The present invention will be further understood by reference to the following specific examples. Unless otherwise indicated, all parts and percentages are by weight.

EXAMPLE I 100 parts of foundry sand (quartz) are mixed thoroughly for 2-8 minutes with from 3-10 parts of a mixture of ingredients. This mixture contains from 50-96% (of the total weight of the mixture) of aqueous sodium silicate, 0.5-45% of organic collapsibility improving agents, and 0.1%-5% of potassium triphenyl siliconate. The resulting foundry mix is then placed into a core or mold box and gassed for 0.5 second with carbon dioxide under a pressure of 0.5 atmosphere to thereby form a cured sand core.

EXAMPLE II 100 parts of foundry sand are mixed for five minutes with 3 parts of a mixture of aqueous sodium silicate and sodium methyl chloro siliconate having the formula:

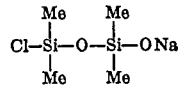

This mixture contained 8% of the siliconate and 92% of the aqueous sodium silicate (48/50° Bé. and a ratio of 2.5). Mold boxes were then filled with this foundry mix which was then treated with gaseous carbon dioxide as described in Example I.

For purposes of comparison, cores were prepared by repeating the procedure, but omitting the siliconate. The cores of the example and the cores prepared for purposes of comparison were then stored for 24 hours at 98% relative humidity. The strengths of the cores were measured both before and after storage at the high humidity. The results obtained by this test are shown in Table I which follows:

TABLE I

| | Shear strength (kg./cm.²) | |
|---|---|---|
| | Foundry mix with siliconate | Foundry mix without siliconate |
| Strength before the storage stability test | 3.9 | 4.2 |
| Strength after storage for 24 hours | 2.8 | 2.2 |

EXAMPLE III

The procedure described in Example II was repeated except that the cores thus prepared were stored for 24 hours in foundry sand containing 5% moisture. Again, strengths before and after storage were measured. The results thus obtained are shown in Table II which follows:

TABLE II

| | Shear strength (kg./cm.²) | |
|---|---|---|
| | Foundry mix with siliconate | Foundry mix without siliconate |
| Strength before storage stability test | 3.9 | 4.2 |
| Strength after storage for 24 hours | 1.9 | 0.9 |

From the foregoing examples and description, it will be appreciated that a novel procedure has been developed for reducing the sensitivity to moisture of sand cores prepared by the $CO_2$ process. Thus, by simply adding small amounts of certain silicon additives to the foundry mixes employed in the $CO_2$ process, it is possible to improve the strengths of sand cores thus obtained when such cores are exposed to moisture in various forms.

Although the present invention has been described with a certain degree of particularity, it will be realized that numerous minor changes and variations, falling within the spirit and scope of this invention, will become obvious to those skilled in the art. It is not intended that this invention be limited to any of the materials which have been specifically mentioned for the sake of illustration, nor by the specific proportions which have been given for the sake of illustration.

What is claimed is:

1. In a process for preparing sand cores wherein a foundry mix is prepared from sand and a binding amount of an aqueous solution of a water-soluble silicate and wherein said mix is thereafter shaped and utlimately cured by contact with gaseous carbon dioxide, the improvement which comprises including in said foundry mix a minor amount sufficient to impart moisture resistance to the composition of an alkali metal methyl or phenyl siliconate.

2. The process of claim 1 wherein the amount of additive is from 0.0003 to 0.5% based on the weight of sand.

3. The process of claim 2 wherein said silicate is aqueous sodium silicate and wherein said additive is potassium-phenyl-siliconate or sodium-methyl-chloro-siliconate.

4. The sand core obtained by the improved process of claim 1.

5. The sand core obtained by the improved process of claim 3.

6. Composition for the fabrication of foundry cores and molds which comprises (1) a major amount of sand, (2) a binding amount up to about 10 percent by weight, based on the weight of the composition, of an aqueous solution of an alkali metal silicate having a silicate concentration of at least about 25 percent by weight and a silica to alkali metal oxide ratio of at least 0.5 to 1; and (3) a minor amount sufficient to impart moisture resistance to the composition of an alkali metal methyl or phenyl siliconate.

7. The composition of claim 6 wherein the amount of siliconate is from 0.0003 to 0.5 percent based on the weight of sand.

8. The composition of claim 6 wherein said silicate is aqueous sodium silicate and wherein said siliconate is a sodium methyl siliconate.

9. Method for improving sand compositions containing aqueous solutions of an alkali metal silicate as a binder and adapted to be fabricated into foundry cores and molds which method comprises incorporating in said composition a minor amount sufficient to impart moisture resistance to the composition of an alkali metal methyl or phenyl siliconate.

10. The method of claim 9 wherein the siliconate is added in an amount of from about 0.0003 to 0.5 percent based on the weight of sand.

11. The method of claim 10 wherein said silicate is aqueous sodium silicate and wherein said siliconate is a sodium methyl siliconate.

References Cited

UNITED STATES PATENTS 2,975,494   3/1961   Cooper _____ 106—38.35 XR

JULIUS FROME, Primary Examiner.

L. HAYES, Assistant Examiner.

U.S. Cl. X.R.

106—38.3, 84, 287; 164—41